(12) United States Patent
Hamre et al.

(10) Patent No.: US 6,701,404 B1
(45) Date of Patent: Mar. 2, 2004

(54) METHOD AND SYSTEM FOR TRANSFERRING VARIABLE SIZED LOOP WORDS BETWEEN ELEMENTS CONNECTED WITHIN SERIAL LOOP THROUGH SERIAL INTERCONNECT

(75) Inventors: John David Hamre, Plymouth, MN (US); Reed Stillman Nelson, Shoreview, MN (US); Christopher John Vankrevelen, Coon Rapids, MN (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/565,147

(22) Filed: May 5, 2000

(51) Int. Cl.$^7$ ................................................ G06F 1/00
(52) U.S. Cl. ...................... 710/307; 710/313; 709/248
(58) Field of Search ................................. 709/248, 250, 709/230–235, 311, 328, 330; 710/105, 106, 107, 305, 313–317, 306, 307

(56) References Cited

U.S. PATENT DOCUMENTS

| | | | | | |
|---|---|---|---|---|---|
| 4,363,093 A | * | 12/1982 | Davis et al. | ................ | 709/248 |
| 5,077,733 A | * | 12/1991 | Whipple | .................... | 370/85.6 |
| 5,638,518 A | * | 6/1997 | Malladi | ...................... | 709/248 |
| 5,802,321 A | * | 9/1998 | Buda et al. | ................. | 709/248 |
| 5,850,389 A | * | 12/1998 | Wesler | ........................ | 370/325 |

\* cited by examiner

*Primary Examiner*—Paul R. Myers
*Assistant Examiner*—Raymond N Phan
(74) *Attorney, Agent, or Firm*—Brooks Kushman P.C.

(57) ABSTRACT

A dynamic perimeter circular bus method and system includes a serial interconnect and elements connected in a serial loop through the serial interconnect. In operation, a variable sized loop word is transferred between elements along the serial loop. A sync character of the loop word is transferred from element to element along the serial loop. The sync character is indicative of the beginning of the loop word. At least one present character of the loop word after the sync character is then transferred from element to element along the serial loop. A present character is then asserted at an element to indicate that a data word follows the asserted present character in the loop word. The data word from the element is then put on to the loop word after the asserted present character thereby increasing the size of the loop word. The data word of the loop word is then transferred from element to element along the serial loop.

13 Claims, 3 Drawing Sheets

Crossbar Arbitration

Bus Emulation

High Speed Arbitration/Data Transfer

All Applications Combined

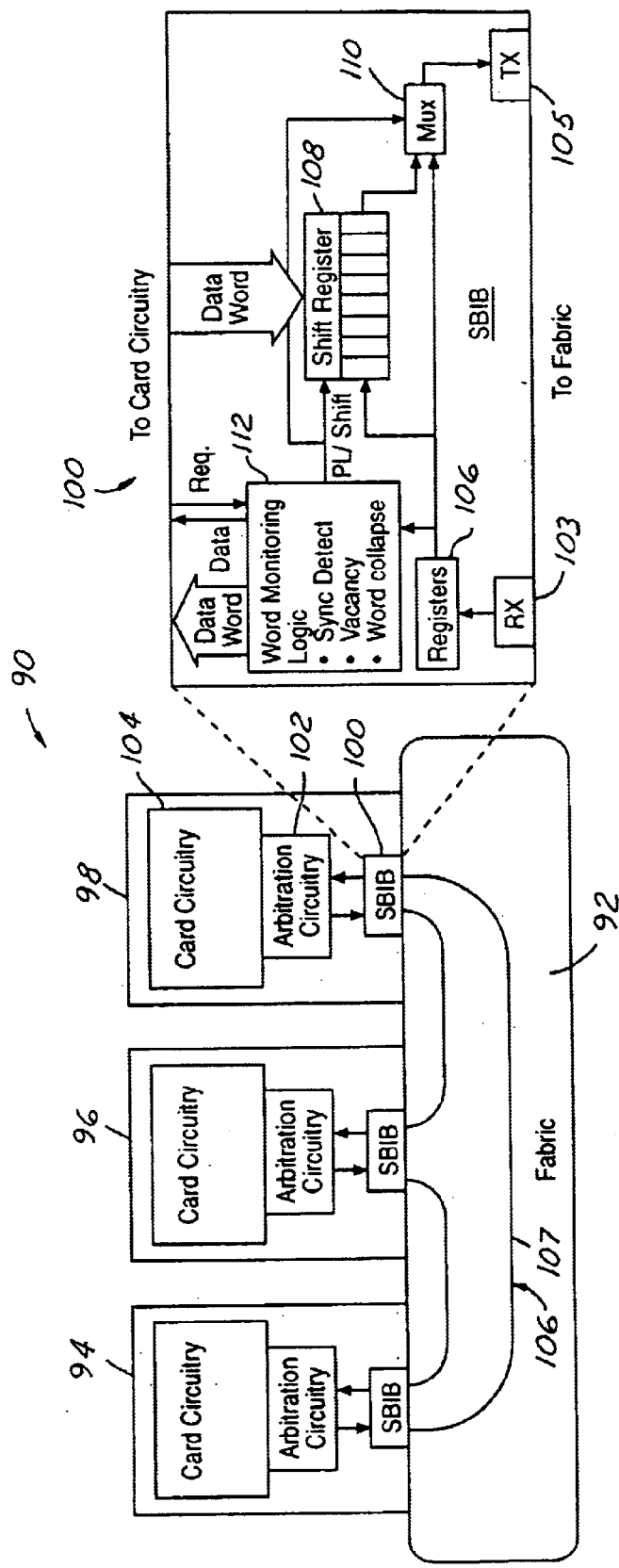

METHOD AND SYSTEM FOR TRANSFERRING VARIABLE SIZED LOOP WORDS BETWEEN ELEMENTS CONNECTED WITHIN SERIAL LOOP THROUGH SERIAL INTERCONNECT

TECHNICAL FIELD

The present invention relates generally to serial interconnect and shared bus methods and systems and, more particularly, to a dynamic perimeter circular bus method and system.

BACKGROUND ART

Serial interconnect has become the industry standard for systems having large bandwidth requirements. Serial interconnect has been chosen over shared bus architectures in many cases because of the scalability, physical reach, pin efficiency, and flexibility associated with it. Unfortunately, some of the desirable characteristics of a shared bus, such as low latency, are lost when using serial interconnect in place of shared bus.

There are many situations where the low latency advantages of a shared bus and the reconfiguration and scaling advantages of serial interconnect are needed. An arbitration function in a system is an example of a function that benefits from the low latency characteristics of a shared bus. The speed at which arbitration is performed often defines system performance. In many cases the arbitration algorithm is simple and a large portion of the time spent doing arbitration is associated with communicating with the entities requiring the system resources. The latency of each communication becomes a very significant factor in arbitration speed and consequently system performance. A shared bus is a good candidate to provide the low latency characteristics that are desired for arbitration. Not only are the latency characteristics of the shared bus attractive for arbitration, but the shared media aspect of the bus forces the sequential servicing of requests keeping arbitration orderly and efficient. Unfortunately, shared bus systems are fixed in both physical topology and bandwidth. These two limiting aspects are overcome with the use of serial interconnect.

Arbitration is just an example of control functions that require low latency but are constrained in performance and reach by a shared bus implementation.

There is a strong desire to use a platform for a variety of applications thus implying widely varying system performance requirements. Serial interconnect affords systems the ability to scale in data bandwidth and topology. The beneficial characteristics of a shared bus are not provided by serial interconnect to date. Thus, there exists a need for an interconnect technology that would give a system the ability to scale in data bandwidth as well as the control functionality.

SUMMARY OF THE INVENTION

Accordingly, it is an object of the present invention to provide a dynamic perimeter circular bus method and system for transferring loop words between elements connected in a serial loop topology.

It is another object of the present invention to provide a dynamic perimeter circular bus method and system for transferring control loop words between elements connected by a serial control loop running through a serial interconnect.

It is a further object of the present invention to provide a dynamic perimeter circular bus method and system for transferring control and data signals between elements connected by respective serial control and data loops running through a serial interconnect.

In carrying out the above objects and other objects, the present invention provides a method for transferring a loop word between a plurality of elements interposed within a serial loop. The method includes transferring a sync character of the loop word from element to element along the serial loop. The sync character is indicative of the beginning of the loop word. At least one present character of the loop word after the sync character is then transferred from element to element along the serial loop. A present character is then asserted at an element to indicate that a data word follows the asserted present character in the loop word. The data word from the element is then put on to the loop word after the asserted present character. The data word of the loop word is then transferred from element to element along the serial loop.

Preferably, the method includes de-asserting a present character of the loop word at an element to indicate lack of a data word following the de-asserted present character in the loop word. The method further includes removing the data word from the loop word at the element after the data word has been transferred along the serial loop to the element.

Preferably, each element is provided with a shift register. Putting a data word onto the serial loop from an element includes putting the data word into the shift register of the element, switching the shift register into the loop, and then shifting the data word from the shift register of the element onto the serial loop.

In carrying out the above objects and other objects, the present invention further provides a system having a serial interconnect and a plurality of elements for carrying out the method of the present invention.

The above objects and other objects, features, and advantages of the present invention are readily apparent from the following detailed description of the best mode for carrying out the present invention when taken in connection with the accompanying drawings.

BRIEF DESCRIPTION OF THE DRAWINGS

FIG. 5 illustrates a dynamic perimeter circular bus system describing the use of a serial control loop in accordance with the present invention; and FIG. 6 illustrates a serial bus interface block (SBIB) of an element in the dynamic perimeter circular bus system of the present invention.

BEST MODES FOR CARRYING OUT THE INVENTION

Figure 1:
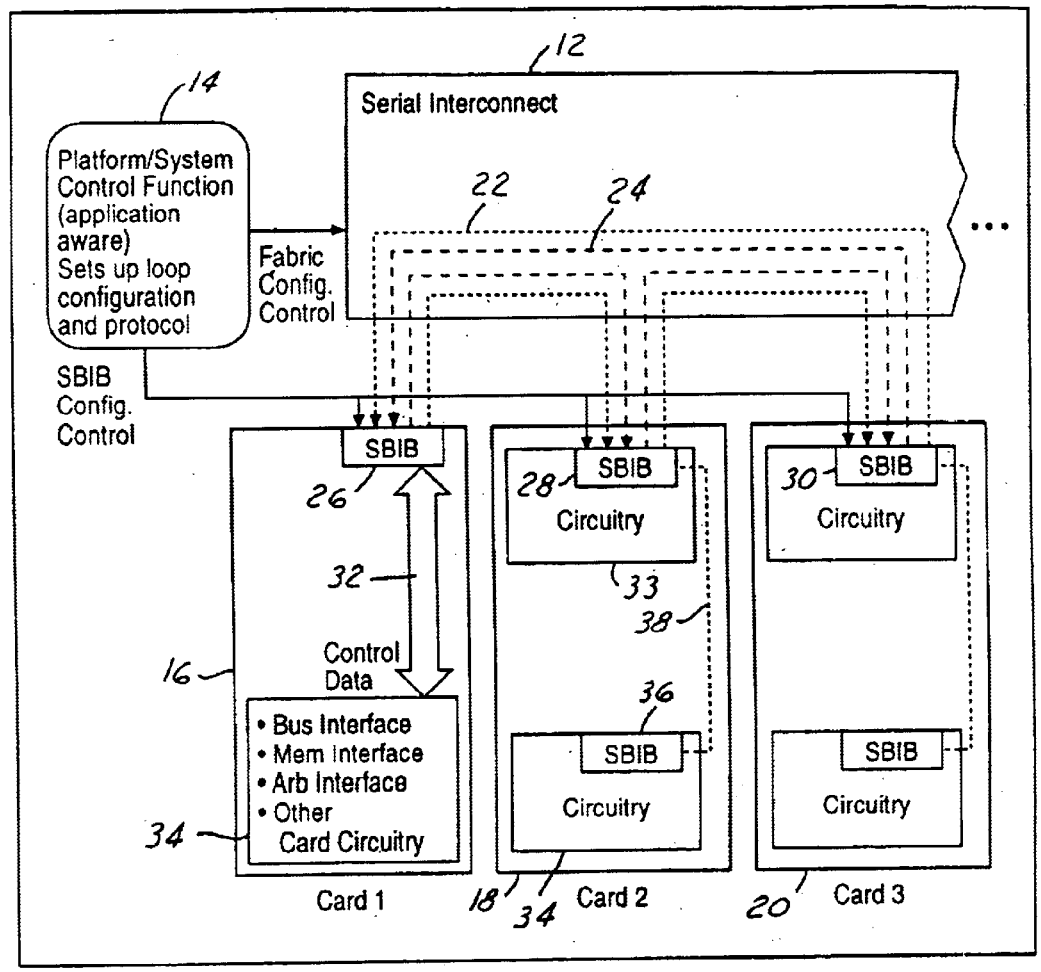
FIG. 1 illustrates a block diagram of the dynamic perimeter circular bus system in accordance with the present invention.

Referring now to FIG. 1, a dynamic perimeter circular bus system in accordance with the present invention is shown.

Dynamic perimeter circular bus system 10 includes a serial interconnect 12, a controller 14, and a plurality of elements 16, 18, and 20. Serial interconnect 12 includes a plurality of crossbar fabrics and/or traces for making point to point serial connections. A dynamic perimeter circular bus consists of one or more loops connecting interposed elements 16, 18, and 20. As shown in FIG. 1, a dynamic perimeter circular bus control loop 22 connects elements 16, 18, and 20. Dynamic perimeter circular bus control loop 22 is used for communicating control signals between elements 16, 18, and 20. Similarly, a dynamic perimeter circular bus data loop 24 connects elements 16, 18, and 20 for communicating data signals between the elements.

The dynamic perimeter circular bus architecture provides low latency (low hundreds to less than ten nanoseconds) control and bus like functionality that is configurable and scalable in bandwidth on an application by application basis. A dynamic perimeter circular bus is a loop or loops of circuit elements (elements) that are serially connected together. The dynamic perimeter circular bus has the characteristics of low latency, flexible protocol and functionality, and the ability to be configured. A dynamic perimeter circular bus is defined as one loop or a number of loops operating in parallel. The dynamic perimeter circular bus architecture assumes the existence of a controlling entity (e.g., controller 14) that configures the loops in protocol and topology. When multiple loops are used in parallel, they are combined to form an information transferring bus having low latency and can transfer both data and control information.

There are two distinguishing attributes of dynamic perimeter circular bus system 10 that provide the performance characteristics needed for low latency and bus like functionality. First, the ability to statically or dynamically configure the topology of a set of one or more loops into an information passing structure that satisfies the specific information passing requirements of the application. Second, the ability to configure the format and type of information circulated in each serial loop so as to satisfy the specific information passing requirements of the application.

Each of elements 16, 18, and 20 includes a respective serial bus interface block (SBIB) 26, 28, and 30. SBIBs 26, 28, and 30 connects elements 16, 18, and 20 to serial interconnect 12. SBIBs 26, 28, and 30 communicate with one another via serial loops 22 and 24 using any type of serial communication known to those skilled in the art. SBIBs 26, 28, and 30 interface a bus, memory structure, or other circuitry to serial interfaces which are connected together with serial interconnect 12. For instance, in element 16, SBIB 26 is a component that converts some form of parallel bus 32 connected to element circuitry 34 into a serial stream that can be extended via the fabric in serial interconnect 12.

Elements 18 and 20 use the dynamic perimeter circular bus for extensibility but they also have respective SBIBs 28 and 30 integrated into components within each element. For instance, SBIB 28 of element 18 is integrated within circuitry 33 typically interconnected with a parallel bus. Element 18 further includes other circuitry 34 typically interconnected with a parallel bus. Circuitry 34 includes a SBIB 36. SBIB 28 and SBIB 36 communicate using at least one dynamic perimeter circular bus 38. Dynamic perimeter circular bus 38 interconnects circuitry 33 and 34 and replaces a standard shared parallel bus such as parallel bus 32 in element 16.

SBIB integration into circuitry or components within element 18 reduces the amount of interconnect needed in the element by more than an order of magnitude. For example, if parallel bus 32 of element 16 is a thirty two bit data bus then circuitry 34 will have sixty four pins. By replacing parallel bus 32 with a dynamic perimeter circular bus such as dynamic perimeter circular bus 38 of element 18 then only four pins are needed by circuitry 34. SBIB integration into circuitry not only reduces the amount of interconnect needed in the element but also lowers the complexity and cost of the element. The lowered complexity and cost reduce the amount of effort and time needed to route the element. If the parts on the element are pin bound then dynamic perimeter circular bus 38 allows the integration of several parts into one. This reduces part count, board real estate, and, again, system cost.

Controller 14 is operable with serial interconnect 12 for providing fabric configuration control. Controller 14 is also operable with SBIBs 26, 28, and 30 for SBIB configuration control. In general, controller 14 is a platform/system control function and sets up dynamic perimeter circular bus loop configuration and protocol.

SBIBS 26, 28, and 30 provide a means to store, observe, modify, and forward the data that exists in the serial loop. SBIBs 26, 28, and 30 also provide inter-loop control functionality that allows multiple loops to be formed into one information passing bus. To construct a dynamic perimeter circular bus, controller 14 connects the SBIBs of the participating elements together through serial interconnect 12. Only those elements that participate in the application need to be put in the serial loop thereby allowing the serial loop to be as small as possible thus reducing latency. The number of loops grouped in parallel to make up the dynamic perimeter circular bus is determined by the bandwidth and latency requirements of the application.

The format and protocol of the data circulated through the dynamic perimeter circular bus must have certain characteristics to allow performance requirements to be met. First, for low latency, the data structure circulated through the serial loop must be as small as possible. The ability of the structure to change size dynamically supports this goal. Second, having the flexibility to configure this structure based upon application need is also a requirement to support a wide range of applications. These characteristics are not represented in any other current transmission standard such as fibre channel arbitrated loop. Such standards do not provide these characteristics because, unlike dynamic perimeter circular bus system 10, they were not intended or designed for extremely low latency, intra-system communication.

Figure 2A:
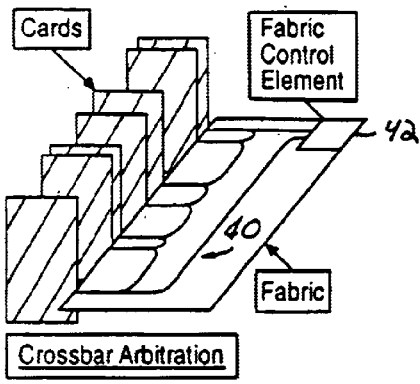
FIGS. 2A, 2B, 2C, and 2D illustrate three different uses and a combined use of the dynamic perimeter circular bus system in accordance with the present invention.

Referring now to FIGS. 2A, 2B, 2C, and 2D, three different uses and a combined use of the dynamic perimeter circular bus architecture will be described. All of the illustrated examples of the dynamic perimeter circular bus architecture assume multiple serial connections to each element. The information circulating in a serial loop could be configured to contain a variety of control and/or data information. A serial control loop could be used for control functions such as arbitration and/or data transfer. A serial loop could also be used simply as a bus. In FIG. 2A, dynamic perimeter circular bus 40 is configured to be used as the arbitration bus for controlling the serial switch fabric. In this case, the controller is used to configure the serial loop so that fabric control element 42 is included in the serial loop. In this application, dynamic perimeter circular bus 40 is not used for data transfer. All data transfer is done via separate point to point connections established on the fabric.

Figure 2B:
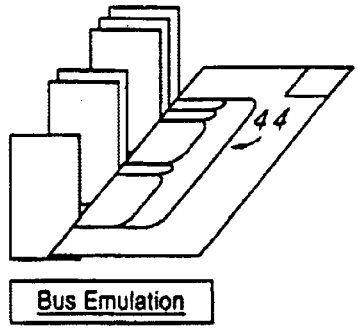
Figure 2C:
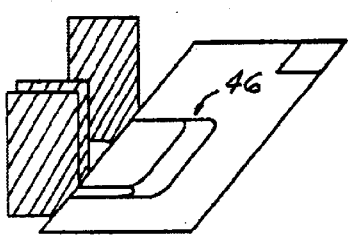

In FIG. 2B, a dynamic perimeter circular bus 44 is configured as a single control/data serial loop. The single control/data serial loop is used like a regular bus. In FIG. 2C, two dynamic perimeter circular busses 46 connect three elements together via six loops of serial interconnect. The first dynamic perimeter circular bus uses one loop strictly for low latency memory transfers. The remaining five loops form the second dynamic perimeter circular bus. The second dynamic perimeter circular bus includes one control loop and four data loops. This dynamic perimeter circular bus is a very high bandwidth data sharing dynamic perimeter circular bus. The bandwidth of this dynamic perimeter circular bus is on the order of four times the serial rate.

Figure 2D:
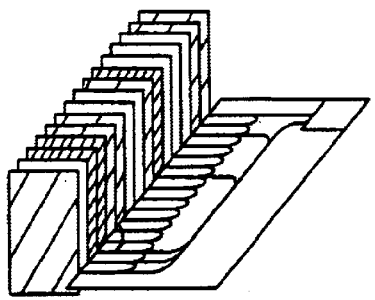

Referring now to FIG. 2D, it is important to note that all of the individual applications illustrated in FIGS. 2A, 2B, and 2C with their respective characteristics all exist in the dynamic perimeter circular bus system at the same time. Applications such as the illustrated applications can be extended across multiple chassis given that delays do not become an issue because of the flexibility of serial interconnect.

The dynamic perimeter circular bus architecture in accordance with the present invention allows a system not constrained in functionality and performance to be built because of the design choices made at the inception of the system. The needs of the applications drive the definition and construction of subsystems with suitable performance characteristics. The subsystems created for the different applications are not required to physically interact with one another thereby allowing the system to be scaled and modified as needed. When the dynamic perimeter circular bus architecture is considered for inter-element communication to replace parallel buses it can significantly reduce pin count, routing complexity, and potentially part count. All of this results in lower element cost and higher reliability. The performance, scalability, and functionality of the dynamic perimeter circular bus architecture enables the conception and implementation of platforms with greatly extended applicability and life span.

As described above in the Background Art section, there exists a need to scale control functions across systems in conjunction with the extension of data fabrics in order to scale the size and performance of future platforms. The characteristics necessary for control functions in a system are often significantly different than that of data. Control functions are typically characterized by their latency and by the frequency with which control operations can be performed. Typically, the performance of the system is defined by the magnitude of these two characteristics and the system bandwidth. With the goals of lowest possible latency and the highest number of control operations in mind, a serial control loop in accordance with the present invention can be constructed that provides significant improvements in these two performance areas.

Figure 3:
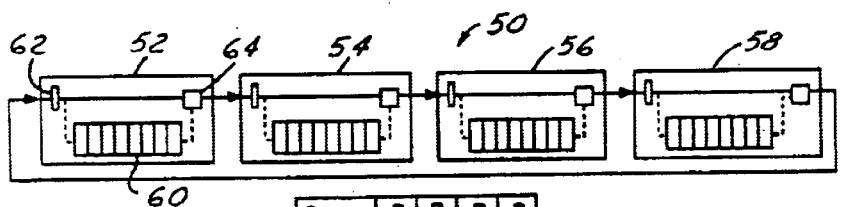
FIG. 3 illustrates a serial control loop of the dynamic perimeter circular bus system in accordance with the present invention in which data words are absent from the serial control loop.
Figure 3:
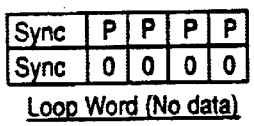

Referring now to FIG. 3, a serial control loop 50 of a dynamic perimeter circular bus system is illustrated. Serial control loop 50 may be used alone as a dynamic perimeter circular bus that performs a control/data transfer function for a system. Serial control loop 50 may also be used in conjunction with other loops to form a larger dynamic perimeter circular bus. Serial control loop 50 is a circular shift register spread across a number of elements 52, 54, 56, and 58. Each element includes a shift register, a flip flop, and a multiplexer. For instance, element 52 includes a shift register 60, flip flop 62, and a multiplexer 64. Flip flop 62 is connected with shift register 60 and multiplexer 64 depending upon its status. If multiplexer 64 connects with shift register 60 then signals are transferred from the shift register to the multiplexer. Multiplexer 64 then transfers the signals to the next element 54. If multiplexer 64 connects with flip flop 62 then signals are transferred from the flip flop to the multiplexer while bypassing shift register 60. As before, multiplexer 64 then transfers the signals to the next element 54. Elements 52, 54, 56, and 58 are connected in a loop such that the signals are transferred from one element to the next until the process repeats itself.

Each element 52, 54, 56, and 58 has a segment of the circular shift register and circuitry to observe and modify the data that circulates through the circular shift register. The segments are connected together with serial interconnect (fabric, traces, and the like) that may extend across many systems.

The data circulating in serial control loop 50 is control information about the state of the desired resource(s) related to the elements participating in the serial control loop. Each element participating in serial control loop 50 observes, and may modify, the information in serial control loop 50 depending upon the functionality of the serial control loop. The required functionality of serial control loop 50 defines the characteristics and consequent protocol the serial control loop must implement. The amount of time needed to circulate data around serial control loop 50 depends on the length of the circular shift register, the delay between the elements, and the rate at which the shift registers are clocked. The length of the circular shift register depends on how many elements are in serial control loop 50 and the length of each segment residing on each element. Shift registers 52, 54, 56, and 58 and other shift registers exist in SBIBs.

With continuing reference to FIG. 3, a protocol method for optimizing the performance of serial control loop 50 will now be described. At any point in time a single word exists on serial control loop 50. The word consists of a number of characters one of which is a sync character "SYNC". The sync character is shown in FIG. 3 and is used to indicate the beginning of the loop word. The sync character allows the participating elements (SBIBs) to stay synchronized with the word. There are also a number of present characters "P" in serial control loop 50 following the sync character. Present characters indicate whether it is possible to put a data word onto the serial control loop. If a present character is de-asserted (i.e., equal to low value 0), then the present character indicates that a data word can be inserted directly after the present character. If a present character is asserted (i.e., equal to a high value of 1), then a data word already follows the present character and an additional word cannot be inserted after the present character.

Other characters may be used in the word such as "fill" characters that do nothing other than fill out the word length. The composition of the word, quantity, and type of characters depends on the configuration of serial control loop 50 and the functionality required for the application. Varying the number of present bits in the word alters the data transfer characteristics and the latency. Using just one present bit per word provides shared bus-like functionality where one element uses the bus at a time.

The most basic loop word includes sync and present bits. Two other possibilities for the loop words are described to illustrate the variety of functionality that can be achieved with dynamic perimeter circular bus. The first example places a field consisting of a fixed number of bits directly after the present bit if the present bit is asserted. This field could be used to define the length of the data word that follows it. Note that a data payload could include data integrity and correction information and the like. For instance, the order of the loop word would be: sync bit, asserted present bit, length field, data word, de-asserted bit, de-asserted bit, etc.

The second example consists of a sync character followed by a present character which when asserted is in turn followed by a definition field. The definition field indicates the type of data that is going to follow. The data may be related to the status of the loop, changes that must be made to the functionality of the loop, or simply data. For instance, the order of the loop word would be: sync bit, asserted present bit, definition field, data word, de-asserted present bit, de-asserted present bit, etc. This method of the second example could be combined with the method of the first example as well.

SBIBs use the characters to transfer data words to other SBIBs in serial control loop 50. When an element needs to communicate with another element in the system, the element examines the circulating present bits. When the element encounters a de-asserted present bit the element can assert the present character and then write a data word immediately after the asserted present character. The data word could be an arbitration request or response, a status word, data; and the like. After the word has circulated around serial control loop 50 it is removed. The word is removed by the same SBIB that wrote it onto serial control loop 50.

The loop word in FIG. 3 is what the loop word looks like with no inserted data words. Serial control loop 50 is optimized to the situation where no data is on the serial control loop, i.e., the serial control loop is inactive. This enables the latency of serial control loop 50 to be kept at a minimum. The amount of time that it takes for a data word to get from source to destination depends on how long the source must wait to find a present character and the length of time required to transfer the data word from source to destination. If serial control loop 50 is inactive the worst situation that a element encounters is waiting for a sync character and present character before writing data onto the serial control loop. This will be a small number of bits, most likely less than ten. The resulting latency would probably be in the 20 nanosecond or less range.

Figure 4:
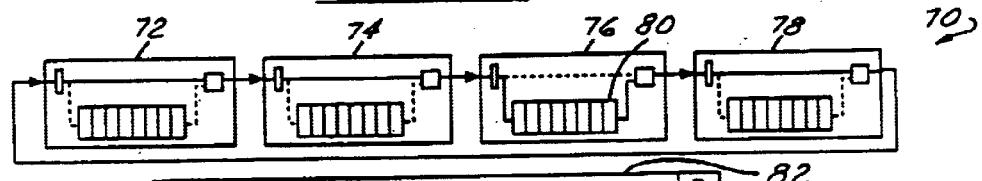
FIG. 4 illustrates a serial control loop of the dynamic perimeter circular bus system in accordance with the present invention in which the serial control loop is activated by having a data word.
Figure 4:
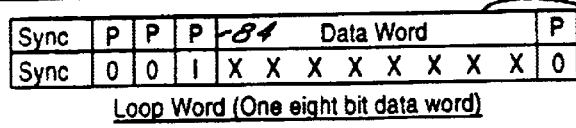

Referring now to FIG. 4, an activated serial control loop 70 having a data word is illustrated. Elements 72, 74, and 78 in serial control loop 70 have not written a data word onto the serial control loop. Consequently, their shift register stages are not included in serial control loop 70. Element 76 has inserted a data word onto serial control loop 70. Consequently, shift register 80 of element 76 is included in serial control loop 70. The data word 82 inserted by element 76 immediately follows the asserted present character 84. Present character 84 was asserted by element 76 prior to inserting data word 82. Note that the size of shift registers is equal to the size of the data word. For instance, shift register 80 has eight slots for providing a respective bit of the eight bit data word.

The serial control loop in accordance with the present invention has the ability to expand and contract depending on the control function needs. The ability of the serial control loop to shrink allows it to maintain minimum latency at all times. It is important to note that all of the elements in the serial control loop can put data words onto the serial control loop independent of one another.

The sync characters and the present characters are basic characters that can be used in different situations to implement various control functions. These characters can be configured in the serial control loop to emulate bus like memory transfers and time division multiplexing (TDM) schemes. The serial control loop provides a means to implement a wide variety of control structures for data and control information transfer.

Referring now to FIG. 5, a dynamic perimeter circular bus system 90 in accordance with the present invention illustrating the use of a serial control loop is shown. Dynamic perimeter circular bus system 90 includes serial interconnect 92 and three elements 94, 96, and 98. Each element includes a SBIB, arbitration circuitry, and element circuitry. For instance, element 98 includes SBIB 100, arbitration circuitry 102, and element circuitry 104. A dynamic perimeter circular bus 106 running through serial interconnect 92 connects elements 94, 96, and 98 together. Dynamic perimeter circular bus 106 includes a serial control loop 107 for the elements to exchange control signals with one another in accordance with the protocol method of the present invention. FIG. 5 represents the situation where elements need information about availability of system resources and the ability to participate in arbitration for them. Arbitration circuitry 102 generates the requests for system resources. The requests are communicated from element to element by serial control loop 107.

Referring now to FIG. 6, SBIB 100 of element 98 is illustrated in greater detail. SBIB 100 includes a receiver 103 for receiving/buffering control signals from serial control loop 107 and a transmitter 105 for transmitting/buffering control signals onto the serial control loop. SBIB 100 further includes a register (flip flop) 106, a shift register 108, and a multiplexer 110 connected between receiver 102 and transmitter 104. SBIB 100 further includes data word monitoring logic circuitry 112. Data word monitoring logic circuitry 112 monitors the signal received from serial control loop 107 to detect sync and present characters and to read data words. Data word monitoring logic circuitry 112 transfers a received data word to arbitration circuitry 102. Arbitration circuitry 102 may then transfer the received data word to element circuitry 104.

If either arbitration circuitry 102 or element circuitry 104 desires to transfer a data word to the other elements 94, 96 in serial control loop 107, then the data word is entered into shift register 108. Assuming that a sync character has been detected and that a present character has been asserted, the data word from shift register 108 is then transferred to multiplexer 110 and then to transmitter 105 and finally to serial control loop 107.

Dynamic perimeter circular bus system 90 assumes that elements 94, 96, and 98 are arbitrating for resources existing on all of the other elements. The resources include such things as an input data buffer. There are three key aspects to understanding the performance advantages of using a serial control loop for this type of resource arbitration. First, all elements are arbitrating for each other's input buffers simultaneously. In the case where there is no contention for input buffers, all elements can arbitrate in one circulation of the serial control loop. Performing arbitration in a parallel, distributed fashion increases the number of decisions made per second dramatically. Second, because only the elements that need to be vying for a resource are included in the serial control loop, the size of the serial control loop is kept to an absolute minimum allowing latency to be minimized in correspondence. In contrast, a system with a fixed shared bus topology is constrained in flexibility and performance. Third, the size of the shift register segment on each element is variable and can be tailored to the size of the data word. The size of the data word depends on the complexity of the arbitration. This optimization keeps the serial control loop size to a minimum thereby reducing latency and maximizing performance.

A serial loop such as a serial control loop is especially suited to decision making functions. Like a shared bus, all information is exposed to all of the participating elements in the serial control loop. Unlike a shared bus, all data signals are presented to all of the participating elements individually and sequentially. This allows decisions and actions to take place discretely and without the threat of contention.

A serial control loop in accordance with the present invention allows the extension of the control functions in and across platforms. The serial control loop also implements control functions in a way that is uniquely compatible with the dynamic perimeter circular bus system of the present invention. It is to be appreciated that the serial control loop stands alone and may be used with systems other than the dynamic perimeter circular bus system of the present invention. The serial control loop allows systems to be built that can tailor their performance characteristics on an application by application basis. Control functions can be implemented that connect racks of equipment together with the only limitation being flight time latency.

Thus it is apparent that there has been provided, in accordance with the present invention, a method and associated system for transferring a loop word between a plurality of elements connected in a serial loop that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for transferring a variable sized loop word between a plurality of elements interposed within a serial loop, the method comprising:
    providing a plurality of elements available for participating in an application, wherein the elements are connected to a serial interconnect, wherein a subset of the elements participate in the application;
    connecting the subset of elements participating in the application together within a serial loop through the serial interconnect;
    transferring a sync character of the loop word from element to element of the subset of elements along the serial loop, the sync character indicative of the beginning of the loop word;
    transferring at least one present character of the loop word after the sync character from element to element of the subset of elements along the serial loop through the serial interconnect;
    asserting a present character at an element of the subset of elements to indicate that a data word follows the asserted present character in the loop word;
    putting the data word from the element on to the loop word after the asserted present character thereby increasing the size of the loop word;
    transferring the data word of the loop word from element to element of the subset of elements along the serial loop through the serial interconnect;
    removing the data word from the loop word at the element after the data word has been transferred along the serial loop through the serial interconnect back to the element thereby decreasing the size of the loop word; and
    de-asserting a present character of the loop word at the element after the element has removed the data word to indicate lack of a data word following the de-asserted present character in the loop word.

2. The method of claim 1 further comprising:
    providing each element with a shift register, wherein putting a data word onto the serial loop from an element includes putting the data word into the shift register of the element, and shifting the data word from the shift register of the element onto the serial loop.

3. The method of claim 2 wherein:
    putting a data word on to the serial loop from an element includes switching the shift register of the element on to the serial loop.

4. The method of claim 1 wherein:
    putting the data word from the element on to the loop includes putting a field character from the element on to the loop word between the asserted present character and the data word.

5. The method of claim 1 wherein:
    a serial loop includes multiple serial loops.

6. The method of claim 1 wherein:
    asserting a present character at an element includes asserting present characters at respective elements simultaneously.

7. The method of claim 1 further comprising:
    removing data words from the loop word at respective elements after the data words have been transferred along the serial loop to the respective elements thereby decreasing the size of the loop word.

8. The method of claim 6 wherein:
    putting the data word from the element on to the loop word includes putting data words from respective elements on to the loop word simultaneously.

9. A dynamic perimeter circular bus system comprising:
    a controller;
    a serial interconnect; and
    a plurality of elements available for participating in an application, wherein the elements are connected to the serial interconnect, wherein a subset of the elements participate in the application;
    wherein the controller connects the subset of elements participating in the application together in a serial loop through the serial interconnect,
    wherein each element of the subset of elements transfers a variable sized loop word from element to element of the subset of elements along the serial loop through the serial interconnect, the loop word including a sync character indicative of the beginning of the loop word and at least one present character, wherein each element of the subset of elements is further operable for asserting a present character in the loop word after the sync character to indicate that a data word follows the asserted present character in the loop word and for putting the data word from the element on to the loop word after the asserted present character thereby increasing the size of the loop words;
    wherein each element is further operable for de-asserting a present character of the loop word at the element to indicate lack of a data word following the de-asserted present character in the loop word, and is further operable for removing the data word from the loop word at the element after the data word has been transferred along the serial loop through the serial interconnect back to the element thereby decreasing the size of the loop word.

10. The system of claim 9 wherein:

each element includes a shift register, wherein each element puts a data word on to the serial loop by putting the data word into the shift register of the element and then shifting the data word from the shift register of the element onto the serial loop.

11. The system of claim 9 wherein:

each element is operable for asserting a present character simultaneously.

12. The system of claim 11 wherein:

each element is operable for putting a data word from the element on to the serial loop simultaneously.

13. The system of claim 10 wherein:

putting a data word on to the serial loop from an element includes switching the shift register of the element on to the serial loop.

* * * * *